United States Patent [19]

Voelz

[11] Patent Number: 5,207,335
[45] Date of Patent: May 4, 1993

[54] CAROUSEL CONVEYOR WITH ROTATABLE STORAGE RACKS

[75] Inventor: Dale Voelz, St. Charles, Ill.

[73] Assignee: White Consolidated Industries, Inc., Cleveland, Ohio

[21] Appl. No.: 889,811

[22] Filed: May 29, 1992

[51] Int. Cl.[5] ............................................. A47F 5/00
[52] U.S. Cl. ................................. 211/122; 312/198; 198/793
[58] Field of Search ............... 211/122, 1.53, 1.55, 211/1.56, 162; 312/198; 198/793, 803.13, 803.14

[56] References Cited

U.S. PATENT DOCUMENTS

| | | | |
|---|---|---|---|
| 3,780,852 | 12/1973 | Weiss et al. | 211/122 |
| 4,625,874 | 12/1986 | Abe et al. | 211/122 |
| 4,723,819 | 2/1988 | Ramberg | 211/163 X |
| 4,821,888 | 4/1989 | Hankes | 211/122 X |
| 5,062,536 | 11/1991 | Tsai | 211/122 X |
| 5,065,872 | 11/1991 | Simon . | |

Primary Examiner—Robert W. Gibson, Jr.
Attorney, Agent, or Firm—Pearne, Gordon, McCoy & Granger

[57] ABSTRACT

A carousel-type storage and access system provides storage units having first and second storage zones accessible through first and second opposed access faces. Each storage unit is mounted for pivotal movement in an access position to one of two operated positions. In one operated position, one access face is conveniently positioned for access by the machine operator. In the other operated position, 180° of rotation from the first operated position, the second access side is positioned for easy access by the operator. A turner unit located at the access position is coupled with the adjacent storage unit and operates to rotate the storage unit to the various operated positions required. Sensors generate signals which can be fed to a computer controller for fully automated operation.

18 Claims, 8 Drawing Sheets

CAROUSEL CONVEYOR WITH ROTATABLE STORAGE RACKS

BACKGROUND OF THE INVENTION

This invention relates generally to carousel-type storage and access systems, and more particularly, to a novel and improved carousel storage and access system permitting access to both sides of a storage unit located at an access position.

PRIOR ART

Carousel-type storage and retrieval conveyor systems are well-known. One typical type provides a plurality of storage units, such as racks or bins, mounted on an oval-powered conveyor. Such conveyors generally provide an oval track having straight sides and semi-circular ends. Generally, access to the storage units is provided at one circular end. Further, it is common to provide vertically positioned, multi-compartment storage racks, so that access can be provided to a number of separate compartments at each indexed position of the conveyor.

Further, it is known, as described in the U.S. Pat. No. 5,065,872 to structure the conveyor system so that access is provided to two separate storage units in a single indexed position of the conveyor. Such system requires of the operator to enter a zone between the two accessible storage units. In systems of such patent, each storage unit or rack provides first and second opposite access faces. A first storage portion is accessible from one access face, and a second storage portion is accessible from the opposite access face. Although two separate storage portions are accessible in each indexed position of the conveyor, one such storage portion is within one storage unit, and the other such storage portion is located in the adjacent storage unit. In such system, the conveyor must be indexed to two separate positions to provide access to both sides of a single storage unit.

SUMMARY OF THE INVENTION

There are a number of important aspects to the present invention. This invention provides a carousel-type storage and access system where a plurality of storage units are mounted on a support for movement between a storage zone and an access position. Each of the storage units is mounted so that it can be turned, in a lazy susan-like manner, while it remains in the access position.

When the support is operated to a given indexed position, a given storage unit is located in the access position. While such storage unit remains in the access position, it can be turned to present at least two different sides for access.

In the illustrated embodiments, each storage unit provides two opposed sides. A first storage portion is accessible from one side, and another separate storage portion is accessible from the other side. Further, in the illustrated embodiments, the storage units are positioned so that such two sides face similar access sides of the next adjacent storage unit when the units are in the storage zone.

Upon reaching the access position, the storage unit can be turned through 90° in opposite directions to operated positions to present one or the other of the access sides to the operator at the access position. With a storage conveyor system, in accordance with this invention, full access can be provided to each access face of a storage unit, while the conveyor remains in a single indexed position.

In accordance with other aspects of this invention, this system is fully powered, both with respect to the indexing of the conveyor and the turning of the storage unit at the access position. Further, feedback sensors are provided so that the system can be fully automated.

For example, in many instances, a manufacturer produces a large number of styles, colors and sizes of articles. Such articles can be loaded on a conveyor system, in accordance with this invention, with a given style, color and size located on a given rack or within a given bin.

When orders are received requiring a specified number of articles of a number of different styles, colors and sizes, the order is fed into a computer controller which controls the storage conveyor. The conveyor then operates under computer control to index the conveyor to move the storage units containing the required articles to the access location. Further, the storage unit is then automatically turned to position the proper side of the storage unit for access to the person assembling the order. Further, in the preferred embodiment, a lightpost is provided which indicates to the order assembler the number of articles in a given bin or on a given rack which are required for the particular order being filled.

These and other aspects of this invention are illustrated in the accompanying drawings and are more fully described in the following specification.

DETAILED DESCRIPTION OF THE DRAWINGS

Figure 1:
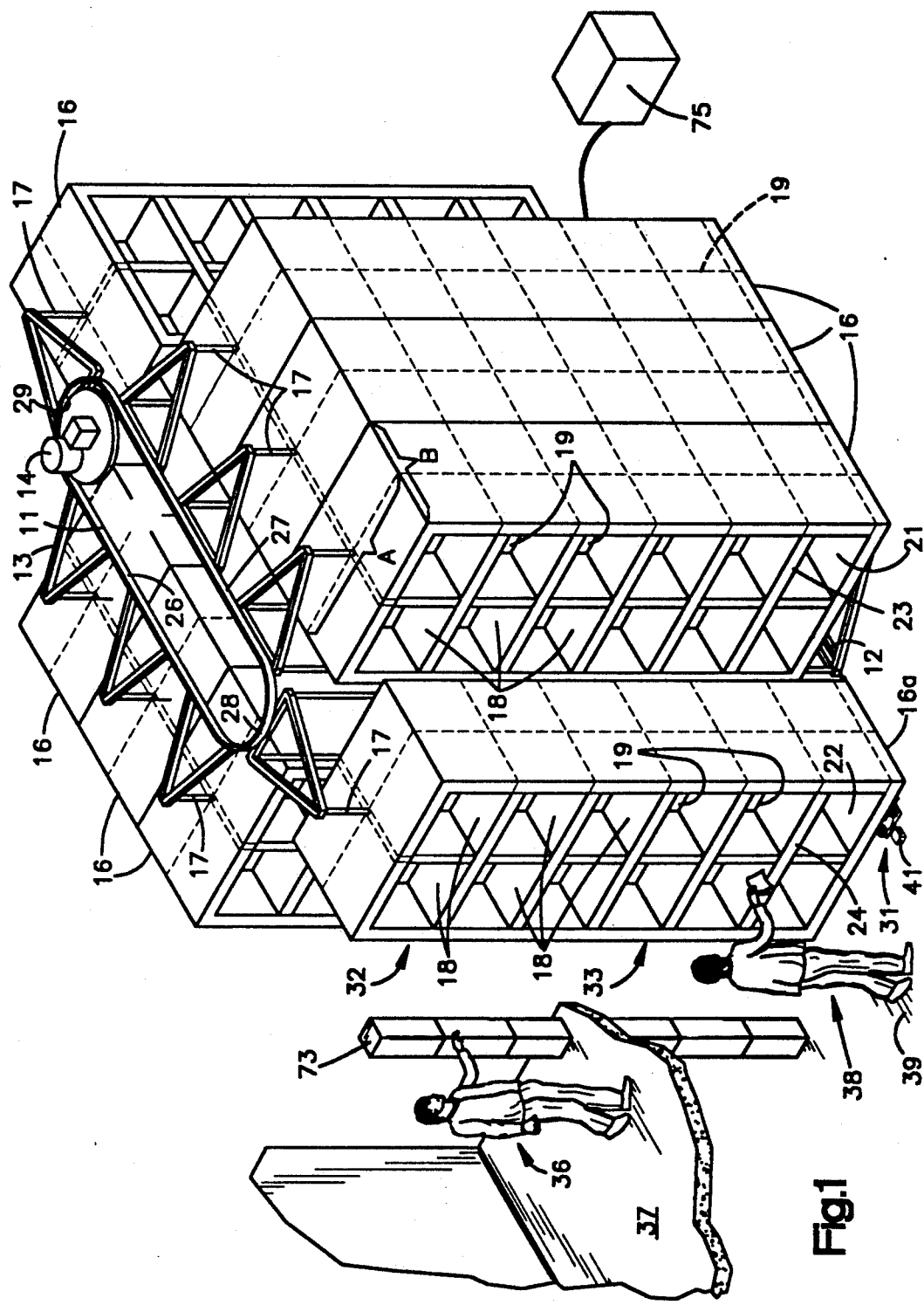
FIG. 1 is a schematic perspective view of a carousel conveyor incorporating the present invention illustrating the storage unit at the access position after it has been turned through 90° to an operated position in which one side thereof is adjacent to the operators.

FIG. 1 schematically illustrates the overall structure of a carousel-type storage and retrieval system, in accordance with the present invention. The machine includes a stationary frame, including upper and lower oval tracks 11 and 12, respectively. Supported on these tracks for movement along the oval is a closed loop support assembly or transporter 13. A motorized drive 14 mounted on the frame causes the support assembly 13 to move along the track to any one of a plurality of indexed positions.

The basic structure of the frame tracks, support assembly, and motorized drive is illustrated and described in substantial detail in the co-pending application Ser. No. 07/710,544, filed Jun. 5, 1991, and assigned to the assignee of the present invention. Such application is incorporated herein by reference in its entirety to illustrate such structural detail of a carousel system which may be utilized in a carousel storage and access system in accordance with the present invention.

Mounted on the support assembly 13 are a plurality of bin-type storage units 16. Each of these storage units 16 is pivotally supported on the adjacent portion of the support assembly 13 by a vertical pivot shaft 17. Such pivot shaft 17 extends vertically and centrally through the various bins 18 of the associated storage units 16.

In the embodiment illustrated in FIG. 1, each of the bins 18 includes a center wall 19 dividing the storage bin into a first storage zone 21, on one side of the center wall 19, and a second storage zone 22, on the opposite side of the center wall 19. Storage zone 21 is accessible through a first side 23 of the associated bin, and the second storage zone 22 is accessible through a second or opposite side 24 of the associated bin.

Preferably, the storage units 16 are mounted so that when the storage units extend along the straight sides of the oval, the first side 23 of each storage unit is substantially adjacent to the second side 24 of the adjacent storage unit. Further, it is preferable to dimension the storage units so that they provide a radial length "A" which is greater than their depth "B". When such proportions are utilized, the storage volume of the total system for a given amount of floor space is greater than would be provided if the length were decreased.

The carousel track provides two straight sides 26 and 27, which are closed at their ends by semi-circular end portions 28 and 29. An access position 31 is located in alignment with the semi-circular end portion 28. It is at this access position that the storage units 16 can be loaded, or articles stored therein can be removed.

In the illustrated embodiment of FIG. 1, a relatively tall carousel is illustrated with storage bins located in upper and lower sectors 32 and 33. A first operator 36 standing on a platform 37 can comfortably reach the bins in the upper sector 32, while a second operator 38 standing on a lower platform or floor 39 has easy access to the bins in the lower sector 33. With this illustrated structure, carousels of substantial height can be structured to utilize the full available height of the building enclosing the carousel unit.

In FIG. 1, the straight sides 26 and 27 are illustrated as relatively short so that the entire unit can be shown on a single page of drawings. However, in practice, the carousel is usually much longer so that many more storage units 16 can be provided.

Figure 1A:
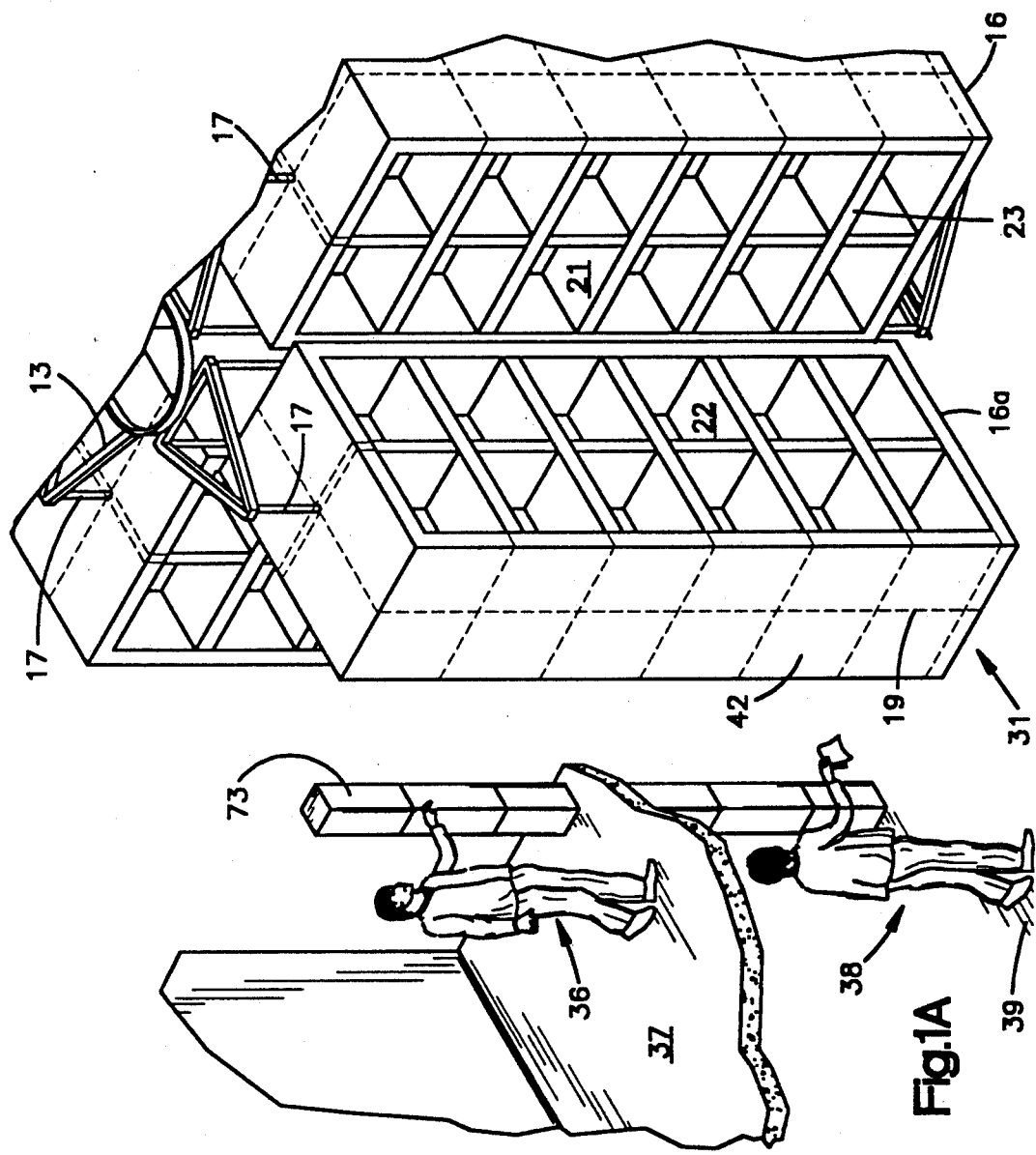
FIG. 1A is a partial perspective view similar to FIG. 1, but illustrating the storage unit at the access position in its normal orientation in which it arrives in such position and before it is turned.

Located at the access position 31 is a storage unit turning assembly 41 which operates to couple with a storage unit 16a delivered to the access position 31 by operation of the motorized drive 14. When each of the storage units 16a initially reaches the access position, the storage unit is in a normal orientation, illustrated in FIG. 1A, in which its length extends radially from the track, and the ends 42 of the bins 18 are adjacent to the two operators 36 and 38. After reaching the access position, the storage unit 16a is turned through 90° in one or the other directions to position one of the two sides 23 or 24 within easy reach of the operators 36 and 38, as illustrated in FIG. 1.

Figure 2:
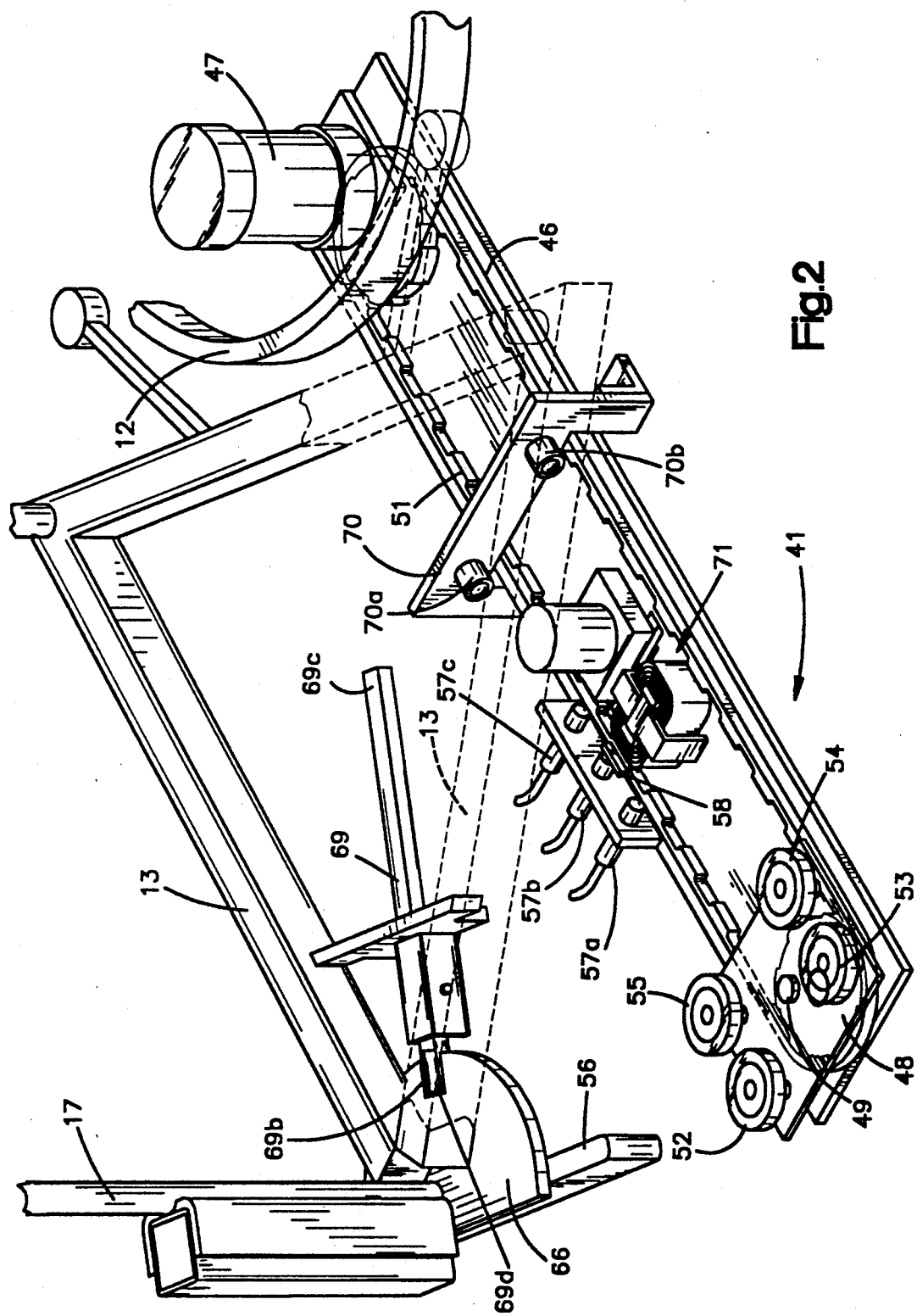
FIG. 2 is an enlarged fragmentary perspective view of the turning assembly which operates to selectively rotate storage units at the access position to operated positions to selectively position one of the two sides thereof for access.
Figure 3:
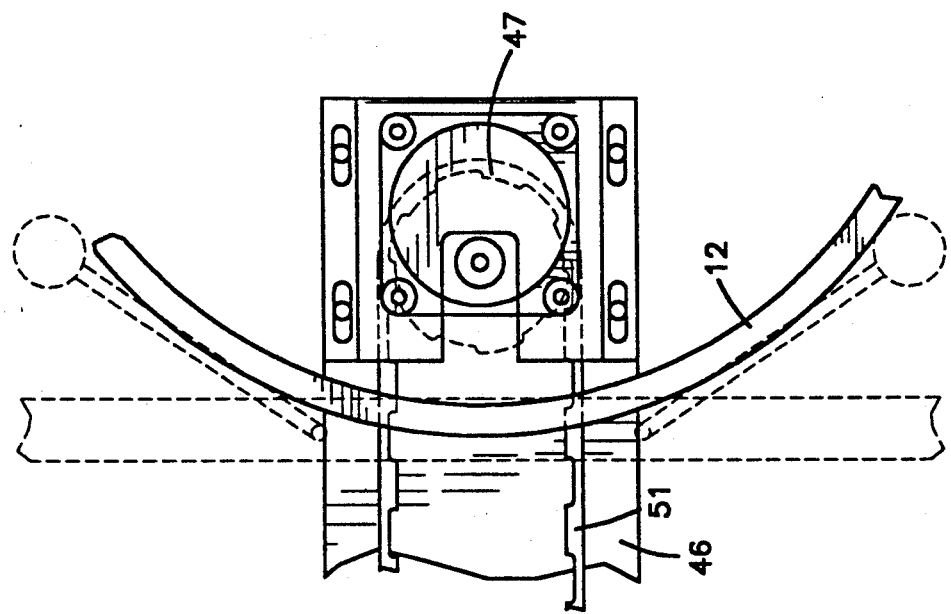
FIG. 3 is a fragmentary plan view of the turning assembly illustrated in FIG. 2, and also illustrating in phantom the lower portion of the storage unit which is operated by the turning assembly.
Figure 3:
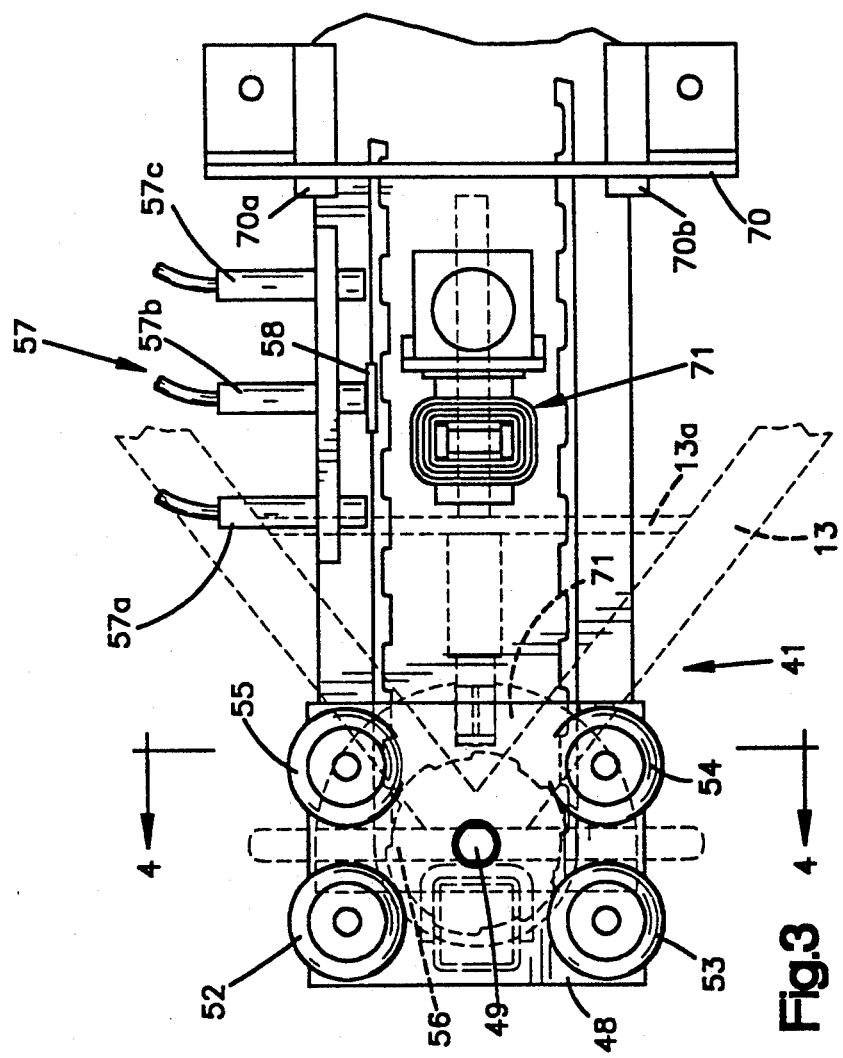
Figure 3A:
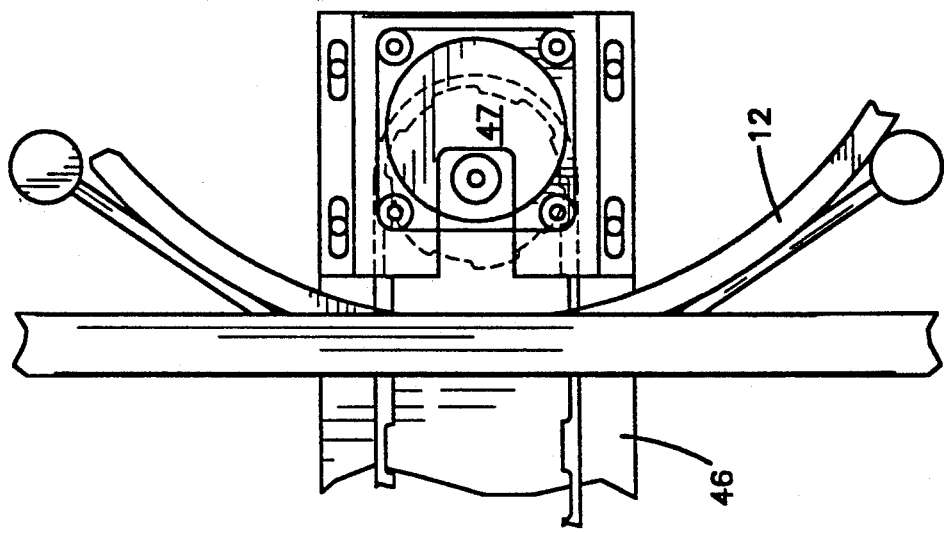
FIG. 3A is a fragmentary plan view similar to FIG. 3, but illustrating the lower portion of the storage unit in full line.
Figure 3A:
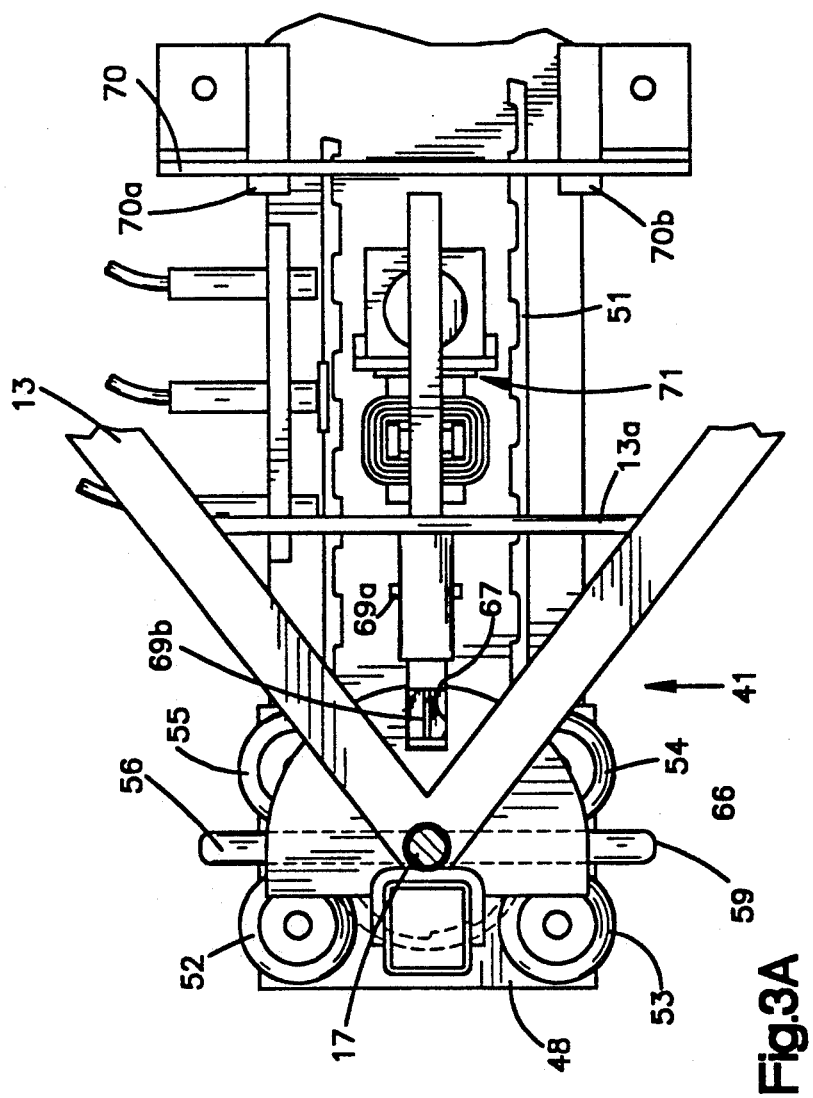
Figure 4:
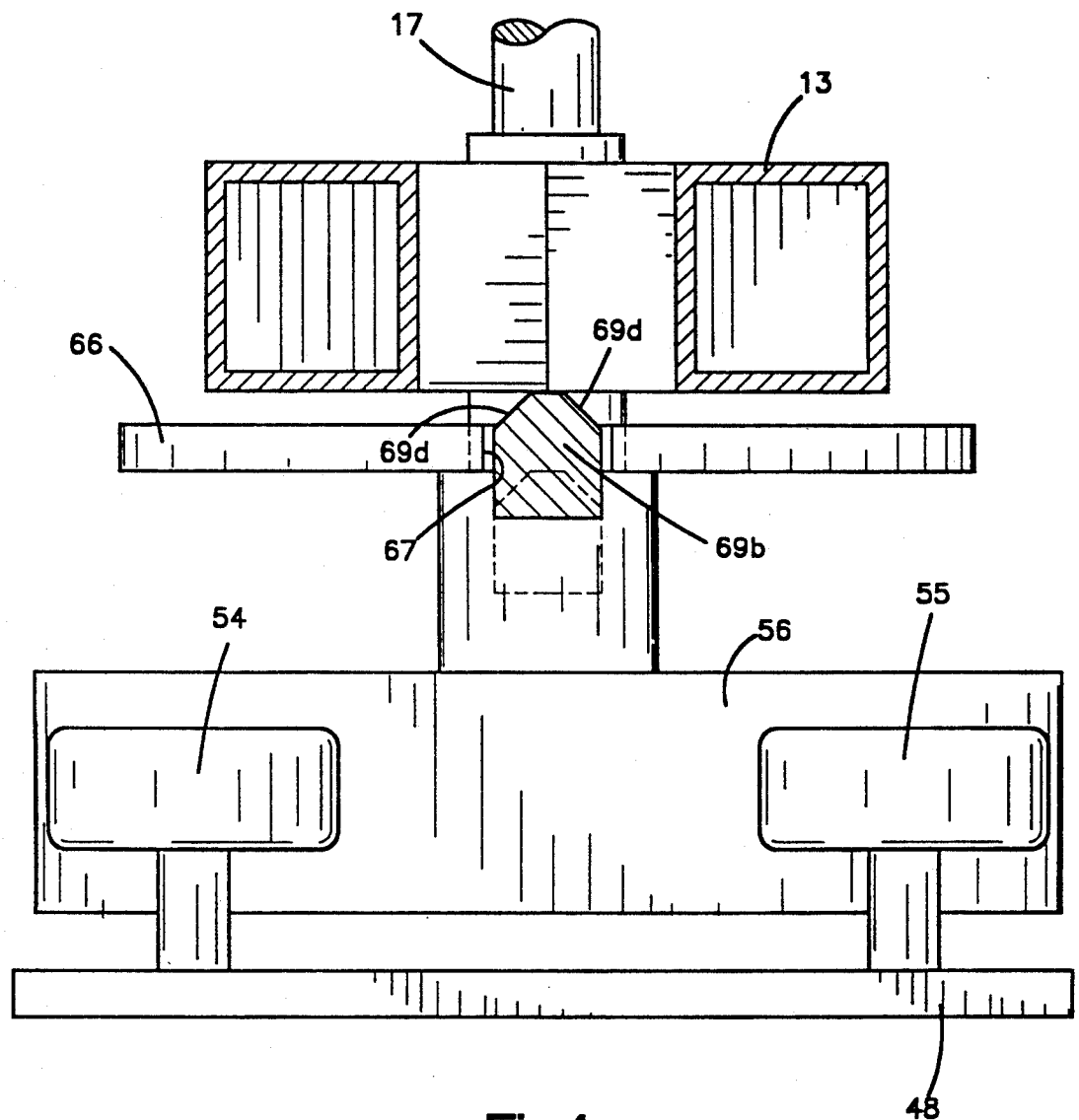
FIG. 4 is a fragmentary side elevation taken along 4—4 of FIG. 3 with parts removed for clarity.

Reference should now be made to FIGS. 2 through 4, which illustrate the structure of the turning assembly 41. The turning assembly 41 provides a base 46 supporting an electric motor 47 within the adjacent portion of the lower track 12. Mounted at the end of the base 46 opposite the motor 47 is a turn table 48 pivotally mounted on the base for rotation about a vertical axis of a pivot pin 49. A drive belt 51 connects the motor 47 and the turn table 48, so that the motor 47 can be operated to turn the turn table in either direction through 90° from the normal position of the turn table illustrated in FIGS. 2, 3 and 3A.

Mounted on the turn table are four rollers 52, 53, 54 and 55. The rollers 52 and 55 are radially spaced, and a similar radial spacing is provided between the rollers 53 and 54. This radial spacing is sized to permit a paddle or blade 56 mounted on the lower end of the associated pivot shaft 17 to be carried to a position between the rollers. The rollers 52 and 53 are positioned on the outer side of the paddle 56 while the rollers 54 and 55 are positioned on the opposite or inner side of the paddle 56. The rollers function as opposed abutments which form a coupling with the paddle 56.

The various proportions are arranged so that as a given storage unit is carried to the access position 31 by the operation of the motorized drive 14, the paddle 56 mounted on the lower end of the associated pivot shaft 17 moves into a position between the rollers mentioned above. The paddle and rollers, therefore, provide a coupling so that rotation of the turn table 48 by the motor 47 operates to cause pivotal movement of the associated storage unit 16a in a direction determined by the direction of rotation of the motor 47. In the illustrated embodiment, such pivotal movement of the storage units extends through an angle of 90° in either direction from the normal storage unit orientation illustrated in FIGS. 1A, 2, 3 and 3A.

A sensing unit 57 is positioned adjacent to the belt 51 and provides three sensors 57a, 57b and 57c. These sensors operate to generate a signal when a sensor plate 58, mounted on the belt, is moved into alignment. When the plate 58 is positioned at the sensor 57b, a signal is generated to indicate that the turn table and the associated storage unit is positioned in its normal orientation for indexing operation of the support assembly 13. When the plate 58 is located at the sensor 57c, a signal is generated to indicate that the turn table 48 and the associated storage unit 16 has been rotated in a clockwise direction through 90° to position the second side 24 of the storage unit 16a to a position for easy access by the two operators 36 and 38. When the plate 58 is positioned at the sensor 57a, a signal is generated, indicating that the storage unit 16a has been rotated in an anticlockwise direction through 90° from the normal orientation so as to position the first side 23 of such storage unit for access by the operators 36 and 38.

A locking system is provided to normally lock each of the storage units 16 in a normal orientation for storage and indexing operation. This locking system, which normally prevents pivotal movement of the various storage units 16, is released when the associated storage unit is in the access position and must be rotated by the turning unit, as described above.

Referring to FIGS. 2-4, a lock plate 66 is mounted on the lower end of the associated pivot shaft 17. Such pivot shaft is journaled on the adjacent portion of the support assembly 13. The lock plate 66 is provided with a radially extending slot 67. A lock lever 69 is pivoted at 69a on a support bracket 13a. The outer end 69b normally fits into the slot 67 and prevents the plate 66 from moving from its normal orientation. This, in turn, ensures that the associated pivot shaft 17 and associated storage unit is located in its proper pivoted position for indexing and storage.

Mounted on the turning unit 41 is a linear actuator 71 positioned below the inner end of the lock lever 69 when the associated storage unit is moved to the access position 31. The inner end 69c of the lock lever 69 is larger and heavier than the outer end 69b. Therefore, gravity normally maintains the outer end 69b in the locking position within the slot 67. When the lock lever 69 must be released to allow pivotal movement of the storage unit at the access position, the actuator 71 is operated to raise the inner end 69c up, which operates to pivot the outer end down out of the slot 67. When the associated storage unit is turned, the outer end slides along the lower side of the plate even if the actuator is de-energized.

When the turning unit returns the storage unit at the access position to its normal orientation, the actuator 71 is de-energized, and gravity causes the outer end to pivot up into the locked position. The outer end 69b is formed with bevels 69d to facilitate such movement. The storage unit is then locked in its normal orientation. At that time, the paddle position is aligned properly so that the main drive 14 can index the carousel to present another storage unit 16 for access.

A second sensing system 70 is provided to establish when a selected one of the storage units is in the access position. This sensing system 70 includes sensor cells 70a which read indicia printed on a plate 13a mounted on the support assembly 13 below each associated storage unit 16. Signals produced by this sensing system are normally fed to a controller 75 which automates the operation of the system.

Preferably, a light pole 73 is provided when the carousel operation is fully automated. Such light pole is connected to the controlling computer 75 and indicates to the respective operators 36 and 38 the bins from which articles should be removed and the number of such articles to be removed. This greatly facilitates the filling of the orders and eliminates the need for the operators to even be supplied with order sheets.

Although the illustrated turning system is located at the lower or floor level, it can also be mounted at the upper end of the storage units.

Figure 5:
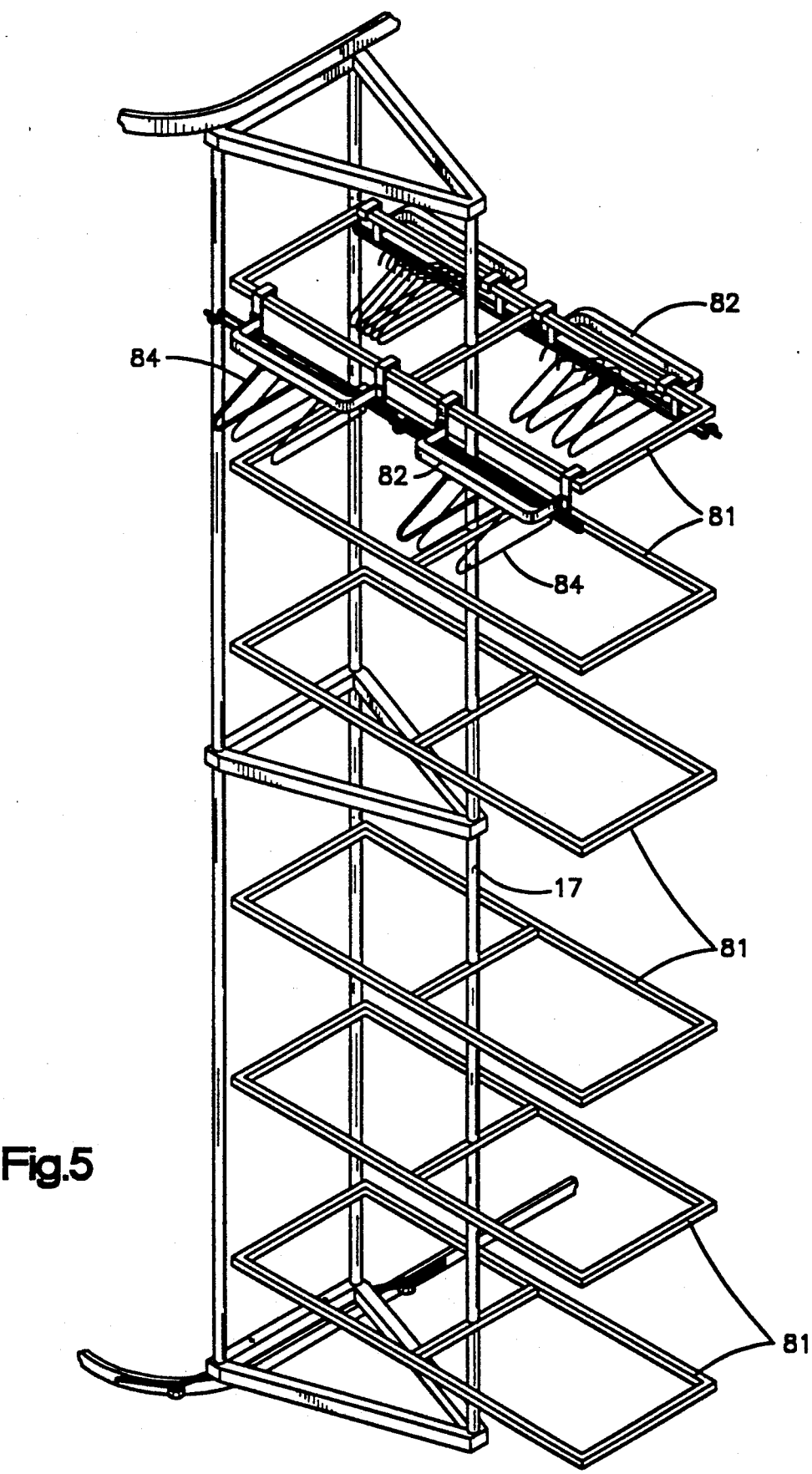
FIG. 5 is a fragmentary perspective view of a rack form of storage unit, particularly suited for the storage and retrieval of small garment items, such as brassieres.
Figure 6:
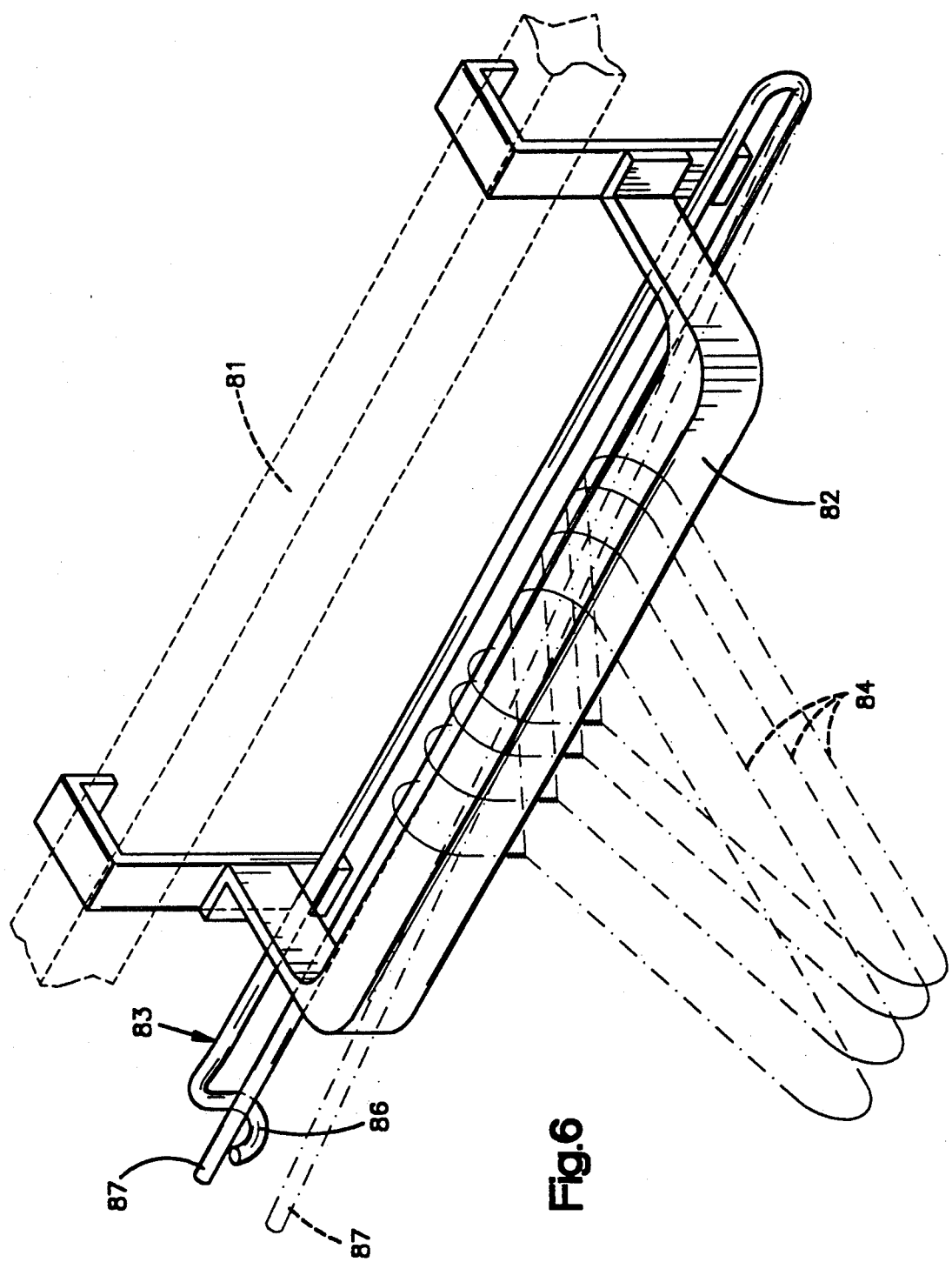
FIG. 6 is an enlarged fragmentary view illustrating one structure for supporting such small garment items on a frame system illustrated in FIG. 5.

FIGS. 5 and 6 illustrate another form of storage unit which may be used for storing and providing access to small garments. In this embodiment, open racks 81 are mounted at vertically spaced locations on a pivot shaft 17 and are, again, rotatable in the access position through 90° in either direction from the normal storage orientation. The individual items are, preferably, supported on hanger assemblies 82 removably mounted on the open racks 81. Each hanger assembly 82 is provided with a handle so that the operator may easily remove or replace the hanger assembly from the open rack.

Further, each hanger assembly provides a U-shaped rod support on which individual hangers 84 can be supported. The rod support 83 provides a hooked end 86 proportioned to cradle the opposite end 87 of the rod support to form a closed support system preventing the hangers from accidentally sliding off of the rod support. When the operator is required to remove hangers 84 and the articles thereon from the rod support, the end 87 is released from the hooked end 86 and allowed to move down to the dotted position so that the required number of hangers 84 can be removed. In this embodiment, like the first embodiment, however, the open rack storage units 81 are mounted for pivotal movement to provide access to the opposite sides of the storage unit in exactly the same manner as in the first embodiment.

As soon as the carousel moves to index a desired storage unit to the access position 31, the turning assembly 41 operates to rotate such storage unit through an angle of 90° in either the clockwise or anti-clockwise direction so as to present one or the other of the sides 23 or 24 for convenient access by the operators 36 and 38. The turning assembly 41 as well as the motorized drive 14 is, preferably, computer controlled for substantially full automated operation by a computer schematically illustrated at 75 and connected to the various sensors and power units described above.

Assuming for the moment that each storage zone 21 or 22 of each bin 18 is loaded with a number of a particular category of items; for example, if the carousel is used to store and provide access to small garments, each bin is loaded with a number of such items of one color, style or size; and other bins are loaded with articles of other styles, sizes and colors. Further, more than one type of article may be stored in the overall carousel system.

When an order is received for a specified number of each of a specified color, style and size of article, the order is, preferably, entered into a control computer 75 which also contains inventory information with respect to the particular bins containing a particular style, color and size of article. The computer then operates to operate the motorized drive 14 to move a particular bin-type storage unit 16 to the access position 31. The same computer then operates the turning assembly to position the appropriate side of the bins 18 of the storage unit 16 located at the access position to face the operators 36 and 39. Preferably, the lightpost 73 located adjacent to the two operators 36 and 38 and is also controlled by the computer to indicate the number of items or articles to be removed from the particular bins adjacent to the operator to fill the order.

After the required number and types of articles are removed from the bins immediately accessible to the two operators, the machine then operates to either rotate the storage unit at the access position 31 to present the opposite side for further order filling, or rotates the bin back to the storage orientation so that the support can be indexed to present the next required storage unit to the access position. The locking system maintains the storage units in proper orientation for storage, excepting when they are rotated at the access position.

Although preferred embodiments of this invention have been shown and described, it should be understood that various modifications and rearrangements of the parts may be resorted to without departing from the scope of the invention as disclosed and claimed herein.

What is claimed is:

1. An article storage and access system comprising a plurality of storage units for storing a plurality of different articles, each unit providing at least first and second sides with a first storage portion accessible from said first side and a second storage portion accessible from said second side, a transporter supporting said units for movement from a storage zone to an access location, said transporter supporting said units at said access location for rotation, said storage units at said access location being rotatable to a first operated position to position said first side for access to said first portion and being rotatable to a second operated position to position a second side for access to said second portion.

2. A storage and access system as set forth in claim 1, wherein said first and second sides of said storage units are on opposite sides thereof, and said first operated position is 180° of rotation from said second operated position.

3. A storage and access system as set forth in claim 2, wherein said storage units are maintained in a normal storage orientation in said storage zone which is substantially 90° of rotation from both of said operated positions.

4. A storage and access system as set forth in claim 3, wherein lock means maintain said storage units in said normal storage orientation, excepting when said storage units are in said access location.

5. A storage and access system as set forth in claim 4, wherein powered turner means operate to unlock storage units at said access location and selectively rotate them to said operated positions.

6. A storage and access system as set forth in claim 5, wherein said system is a carousel-type storage and access system providing an oval track along which said transporter moves to position selected storage units at said access position.

7. A carousel-type storage and access system as set forth in claim 5, wherein said turner means is located at said access position and provides coupling means for connecting with storage units at said access position to cause such storage means to rotate in response to operation of said turner means.

8. A carousel-type storage and access system comprising oval track means, a powered transporter mounted on said track means, a plurality of storage units mounted on said transporter, said transporter operating to position selected storage units in an access location, said storage units providing opposed first and second sides with a first storage portion accessible from said first side and a second storage portion accessible from said second side, said storage units being journaled on said transporter for rotation to first and second operated positions 180° of rotation apart, and a powered turner operating to turn storage units at said access position to selected of said operated positions.

9. A carousel-type storage and access system as set forth in claim 8, wherein said storage units and said turner means provide a coupling when a storage unit is in said access location for turning such storage unit in response to operation of said turner.

10. A carousel-type storage and access system as set forth in claim 9, wherein said coupling includes opposed abutments and a blade which becomes positioned between said abutments when a storage unit moves to said access location.

11. A carousel-type storage and access system as set forth in claim 10, wherein said turner means includes a turn table, and each storage unit provides a blade, said opposed abutments being provided by space rollers mounted on said turn table.

12. A carousel-type storage and access system as set forth in claim 11, wherein lock means normally operate to lock said storage units against rotation, and said turner operates to release said lock means of a storage unit at said access location to permit turning thereof to said operated positions.

13. A carousel-type storage and access system as set forth in claim 12, wherein sensors provide a first signal indicating a selected storage unit is in said access position, and a second signal indicating the rotational position of the storage unit at said access location, and a controller automatically operates said carousel system in response to said signals.

14. A carousel-type storage and access system as set forth in claim 13, which includes an indicator adjacent said access location controlled by said controller to indicate the location of articles to be removed from said storage unit.

15. A carousel-type storage and access system as set forth in claim 8, wherein lock means normally operate to lock said storage units against rotation, and said turner means operate to release said lock means of a storage unit at said access location to permit turning thereof to said operated positions.

16. A carousel-type storage and access system as set forth in claim 8, wherein said storage units provide an open rack structure on which articles can be hung.

17. A carousel-type storage and access system as set forth in claim 8, wherein said storage unit provides a plurality of bins for separate storage of articles.

18. A carousel-type storage and access system as set forth in claim 8, wherein said storage units are sufficiently tall to allow a lower operator access to the lower portions of each storage unit while an upper operator on an elevated platform has access to the upper portions of said storage units.

* * * * *